United States Patent
Hatanaka et al.

(10) Patent No.: US 7,529,474 B2
(45) Date of Patent: May 5, 2009

(54) HAND SHAKE BLUR DETECTING APPARATUS

(75) Inventors: Haruo Hatanaka, Kyoto (JP); Shinpei Fukumoto, Neyagawa (JP)

(73) Assignee: Sanyo Electric Co., Ltd., Moriguchi, Osaka (JP)

( * ) Notice: Subject to any disclaimer, the term of this patent is extended or adjusted under 35 U.S.C. 154(b) by 310 days.

(21) Appl. No.: 11/523,660

(22) Filed: Sep. 20, 2006

(65) Prior Publication Data

US 2007/0065126 A1    Mar. 22, 2007

(30) Foreign Application Priority Data

Sep. 22, 2005    (JP) .............................. 2005-275281

(51) Int. Cl.
    *G03B 17/00*    (2006.01)
(52) U.S. Cl. .................................... 396/52; 348/208.99
(58) Field of Classification Search .............. 348/208.6, 348/239, 281, E5.046, 208.99, 341, 208.1, 348/208.5; 396/52–55, 421, 205, 206, 301, 396/303; 73/570; 352/53
See application file for complete search history.

(56) References Cited

U.S. PATENT DOCUMENTS 5,734,932 A * 3/1998 Washisu ...................... 396/55
7,180,043 B2 * 2/2007 Washisu .................... 250/208.1
2006/0291841 A1 * 12/2006 Fukumoto et al. ............. 396/55
2007/0014554 A1 * 1/2007 Sasaki et al. .................. 396/55

FOREIGN PATENT DOCUMENTS

| JP | 60-143330 | 7/1985 |
| JP | 63-050729 | 3/1988 |
| JP | 04-068322 | 3/1992 |
| JP | 07-020521 | 1/1995 |
| JP | 07-301836 | 11/1995 |

\* cited by examiner

*Primary Examiner*—Reena Aurora
(74) *Attorney, Agent, or Firm*—NDQ&M Watchstone LLP

(57) ABSTRACT

A hand shake blur detecting apparatus for detecting hand shake blur of an imaging device based on an output signal of a hand shake blur sensor for detecting the hand shake blur of the imaging device is provided, the hand shake blur detecting apparatus including a high pass filter calculating part for removing low frequency component from the output signal of the hand shake blur sensor; an inverse high pass filter calculating part, having an inverse transfer function of a transfer function of the high pass filter calculating part, for filtering an output signal of the high pass filter calculating part; an offset value calculating part for calculating the offset value based on an output data of the inverse high pass filter calculating part; and an offset value subtracting part for subtracting the offset value calculated by the offset value calculating part from the output data of the inverse high pass filter calculating part.

5 Claims, 11 Drawing Sheets

$$\begin{array}{ccc} 1 & 1 & 1 \\ 0 & 0 & 0 \\ -1 & -1 & -1 \end{array}$$

$$\begin{array}{ccc} 1 & 0 & -1 \\ 1 & 0 & -1 \\ 1 & 0 & -1 \end{array}$$

HAND SHAKE BLUR DETECTING APPARATUS

BACKGROUND OF THE INVENTION

1. Field of the Invention

The present invention relates to a hand shake blur detecting apparatus.

2. Description of the Related Art

A still image hand shake blur correction technique is a technique for reducing hand shake blur in photography (still image shooting), and is achieved by detecting the hand shake blur and stabilizing the image based on the detected result.

A method of detecting the hand shake blur includes a method of using a hand shake blur sensor (angular velocity sensor), and an electronic method of detecting by analyzing the image. The method of stabilizing the image may be an optical method in which the lens and imaging sensors are stabilized, or an electronic method in which the blur caused by hand shake is removed through image processing.

The completely electronic hand shake blur correction technique, that is, a technique of generating the image in which hand shake blur is removed by analyzing and processing only one photographed hand shake blur image has not reached the practical level. In particular, obtaining a hand shake blur signal of a precision obtained by a hand shake blur sensor is difficult by analyzing one hand shake blur image.

Therefore, it is realistic to detect the hand shake blur using the hand shake blur sensor, and remove the hand shake blur through image processing using the hand shake blur data. The removal of blur through image processing is referred to as image restoration. The method including the hand shake blur sensor and image restoration is herein referred to as an electronic hand shake blur correction.

Conventionally, an angular velocity sensor or an acceleration sensor is used as a device for detecting the hand shake blur of a video camera, a digital still camera and the like. The hand shake blur detecting apparatus thereof is also becoming miniaturized to miniaturize the equipment. However, when the detecting section of the hand shake blur detecting apparatus is miniaturized, the drift or offset component is added to the output signal due to change in temperature of the environment or rise in temperature caused by the use of the element itself, and the output precision lowers. In particular, that in which the detecting section is configured with a piezoelectric element is proposed to achieve miniaturization, but a large drift occurs at the output signal due to the change in electrostatic capacity in addition to the change in shape by change in temperature.

The technique for removing the drift component is proposed by Japanese Laid-Open Patent Publication No. 60-143330. This technique effectively removes only the drift component having low frequency compared to the hand shake blur component by applying a high pass filter (HPF) to the output signal of the angular velocity sensor. However, if the cut-off frequency of HPF is increased, the hand shake blur component is also removed. Further, if the cut-off frequency of the HPF is reduced, the time constant becomes large, and a long stable period becomes necessary to clear the residual component of the hand shake blur, and thus the stop state over a long period of time is necessary before shooting.

A countermeasure for the problem originating from the cut-off frequency of the HPF is proposed in Japanese Laid-Open Patent Publication No. 63-50729, Japanese Laid-Open Patent Publication No. 7-301836, Japanese Laid-Open Patent Publication No. 4-68322, and Japanese Laid-Open Patent Publication No. 7-20521.

In Japanese Laid-Open Patent Publication No. 63-50729, a technique of shortening the convergence time of the residual component of the hand shake blur by arranging a plurality of HPFs having different time constant, and switching from the HPF having a small time constant to the HPF having a large time constant is proposed. However, the offset component (DC component) becomes included in time of switching the HPF in this technique.

In Japanese Laid-Open Patent Publication No.7-301836, a technique of shortening the time for clearing the large hand shake blur residual component by changing the time constant of the HPF according to the size of the hand shake blur signal is proposed. However, the offset component (DC component) that is difficult to measure is included when changing the time constant of the HPF.

In Japanese Laid-Open Patent Publication No. 4-68322, a technique of giving a warning or prohibiting release until the output of the sensor stabilizes is proposed, but the photo opportunity may be missed.

In Japanese Laid-Open Patent Publication No. 7-20521, a technique of clearing the residual component in a moment without containing the offset component by initializing the HPF when the input signal of the HPF is 0 is proposed. However, in this technique, the residual component cannot be removed if the input signal of the HPF does not become 0 after the generation of large residual component.

SUMMARY OF THE INVENTION

The present invention aims to provide a hand shake blur detecting apparatus in which a high precision hand shake blur signal is obtained.

The hand shake blur detecting apparatus according to the present invention is a hand shake blur detecting apparatus for detecting hand shake blur of an imaging device based on an output signal of a hand shake blur sensor for detecting the hand shake blur of the imaging device; the hand shake blur detecting apparatus including a high pass filter calculating means for removing low frequency component from the output signal of the hand shake blur sensor; an inverse high pass filter calculating means for performing on the output signal of the high pass filter calculating means, a filter calculation of an inverse transfer function of the high pass filter; an offset value calculating means for calculating the offset value based on the output data of the inverse high pass filter calculating means; and an offset value subtracting means for subtracting the offset value calculated by the offset calculating means from the output data of the inverse high pass filter calculating means.

The offset value calculating means used, for example, calculates the average value of the output data of the inverse high pass filter calculating means within a predetermined period before the start of exposure by the imaging device, and sets the calculated average value as the offset value.

The offset value calculating means used, for example, calculates the average value of the output data of the inverse high pass filter calculating means within a predetermined period including before and after the start of exposure by the imaging device, and sets the calculated average value as the offset value.

The offset value calculating means used, for example, calculates the average value of object data for offset value calculation and sets the calculated average value as the offset value, wherein the object data for offset value calculation consist of, out of the output data of the inverse high pass filter calculating means within a predetermined period before the start of exposure by the imaging device, only the output data within a predetermined range with the average value of the output data as the center.

The offset value calculating means used, for example, calculates the average value of object data for offset value calculation and sets the calculated average value as the offset value, wherein the object data for offset value calculation consist of, out of the output data of the inverse high pass filter calculating means within a predetermined period including before and after the start of exposure by the imaging device, only the output data within a predetermined range with the average value of the output data as the center.

BRIEF DESCRIPTION OF THE DRAWINGS

FIG. 3 is an electric circuit diagram showing a configuration example of a HPF calculating part 12a;

FIG. 4A is a graph showing an output signal of the HPF calculating part 12a;

FIG. 4B is a graph showing an output signal of a HPF calculating part 13a;

FIG. 6 is a flow chart showing the procedures for the offset value calculating process by the offset value calculating part 14a;

FIG. 7 is a flow chart showing procedures of other examples of the offset value calculating process by the offset value calculating part 14a;

DETAILED DESCRIPTION OF THE PREFERRED EMBODIMENTS

An example of applying the present invention to a digital camera will now be described with reference to the figures.

[1] Configuration of Hand Shake Blur Correction Processing Circuit

Figure 1:
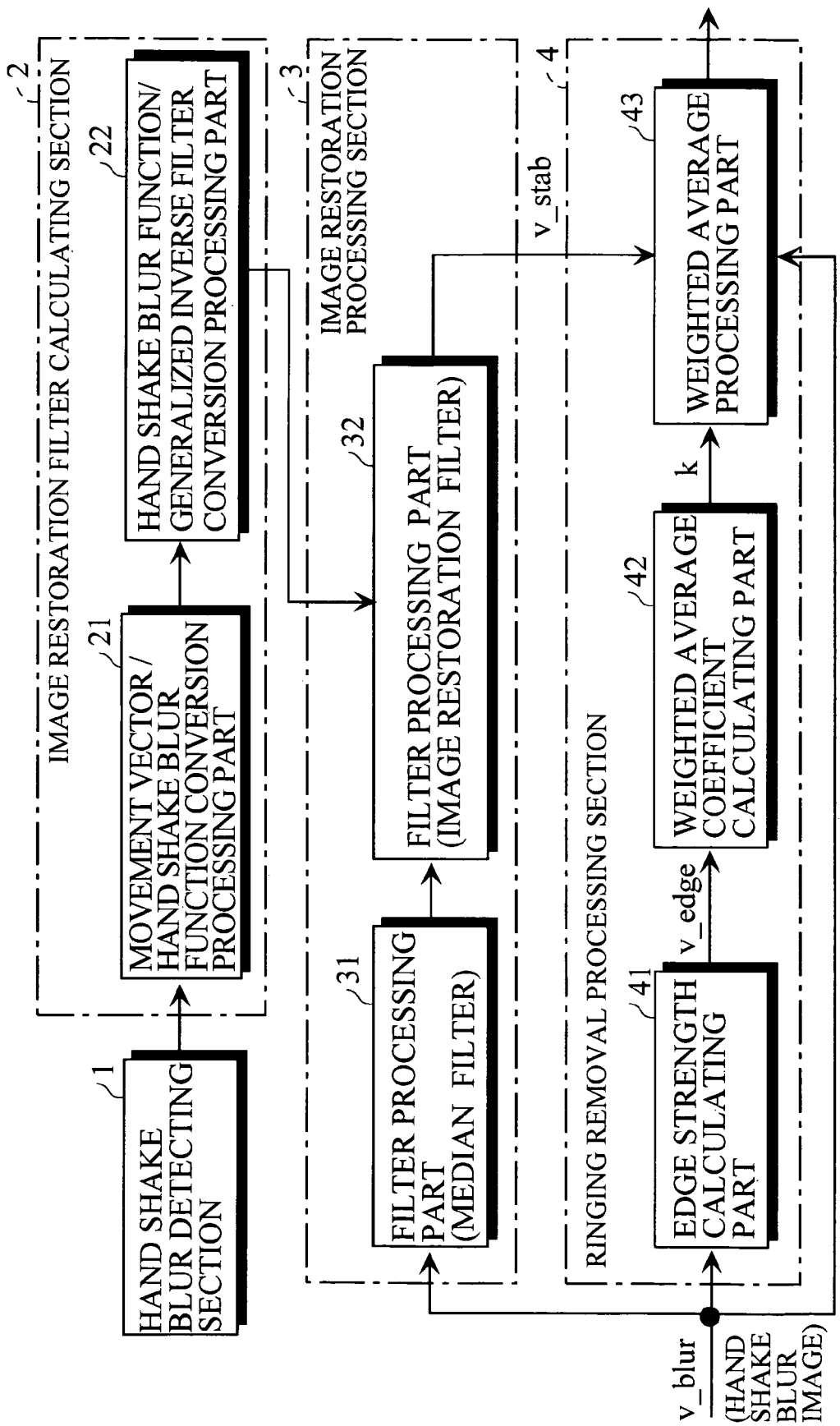
FIG. 1 is a block diagram showing a configuration of a hand shake blur correction processing circuit arranged in a digital camera.

FIG. 1 shows the configuration of the hand shake blur correction processing circuit arranged in the digital camera.

The hand shake blur correction processing circuit includes a hand shake blur detecting section 1, an image restoration filter calculating section 2, an image restoration processing section 3, and a ringing removal processing section 4.

The hand shake blur detecting section 1 detects the hand shake blur of the digital camera. The image restoration filter calculating section 2 calculates the coefficient of the image restoration filter based on the hand shake blur signal detected by the hand shake blur detecting section 1. The image restoration processing section 3 performs image restoration process on the imaged image (hand shake blur image) based on the coefficient calculated by the image restoration filter calculating section 2. The ringing removal processing section 4 removes ringing from the restored image obtained by the image restoration processing section 3.

The hand shake blur detecting section 1, the image restoration filter calculating section 2, the image restoration processing section 3, and the ringing removal processing section 4 will now be described.

[2] Description of Hand Shake Blur Detecting Section 1

Figure 2:
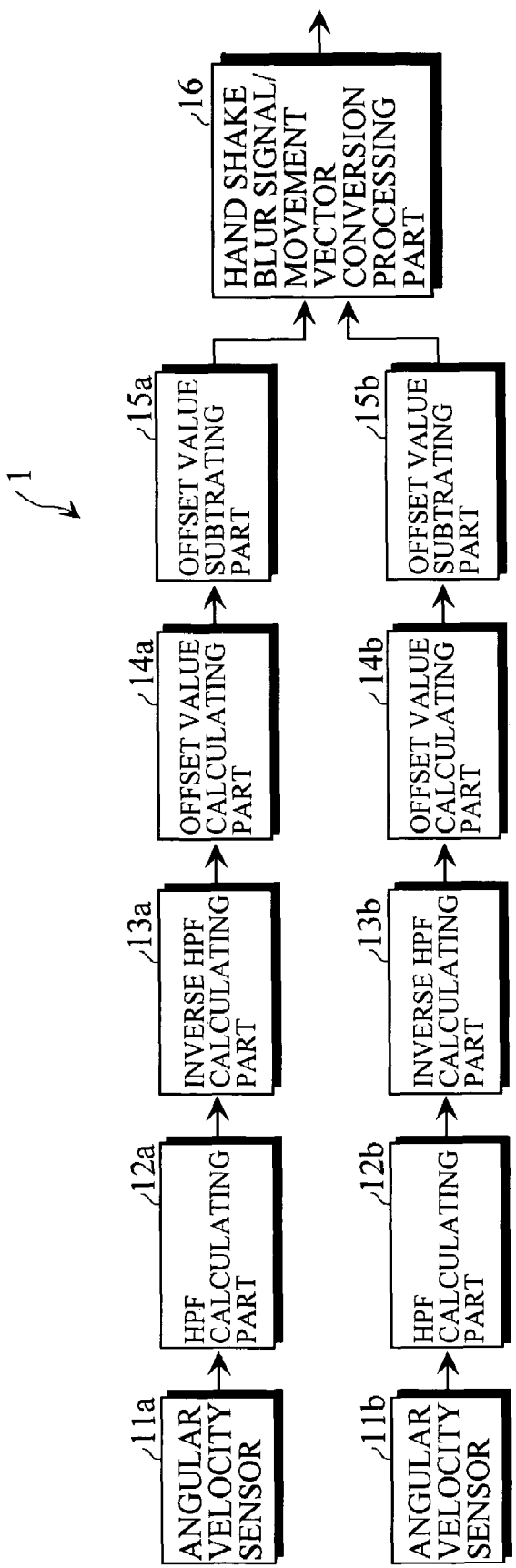
FIG. 2 is an electric circuit diagram showing a configuration of a hand shake blur detecting section 1.

FIG. 2 shows the configuration of the hand shake blur detecting section 1.

The hand shake blur detecting section 1 includes two of angular velocity sensors 11a, 11b; HPF calculating parts 12a, 12b; inverse HPF calculating parts 13a, 13b; offset value calculating parts 14a, 14b; offset value subtracting parts 15a, 15b; and a hand shake blur signal/movement vector conversion processing part 16.

One angular velocity sensor 11a detects the angular velocity in the pan direction of the camera, and the other angular velocity sensor 11b detects the angular velocity in the tilt direction of the camera. Each angular velocity sensor 11a, 11b measures the angular velocity at a predetermined sampling interval.

The HPF calculating parts 12a, 12b respectively remove the drift component and the offset component contained in the output signal of each angular velocity sensor 11a, 11b by means of the HPF. The inverse HPF calculating parts 13a, 13b perform on the output of the HPF calculating parts 12a, 12b, the filtering process of the property of the inverse transfer function of the HPF used in the HPF calculating parts 12a, 12b.

The offset value calculating parts 14a, 14b calculate the offset value from the output of the inverse HPF calculating parts 13a, 13b. The offset value subtracting parts 15a, 15b subtract the offset value calculated at the offset value calculating parts 14a, 14b from the output of the inverse HPF calculating parts 13a, 13b. The hand shake blur signal/movement vector conversion processing part 16 generates the movement vector or the apparent movement amount on the screen based on the output signal of the offset value subtracting parts 15a, 15b.

[2-1] Description of HPF Calculating Parts 12a, 12b

The drift or offset components of low frequency are contained in the output signal of the angular velocity sensors 11a, 11b due to change in temperature of the environment, rise in temperature caused by use of the element itself and the like. The drift and offset components of low frequency contained in the output signal of the angular velocity sensors 11a, 11b are removed by the HPF calculating parts 12a, 12b including the HPF having a cut-off frequency of 0.1 to 0.3 Hz.

Figure 3:
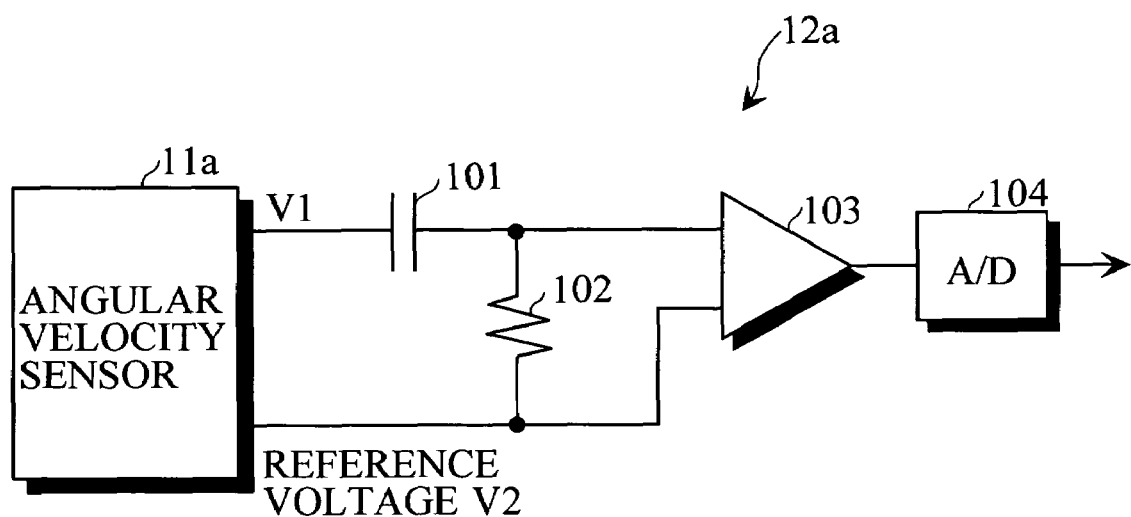

FIG. 3 shows a configuration example of the HPF calculating part 12a.

The angular velocity sensor 11a outputs a sensor signal V1 and a reference voltage V2. The sensor signal V1 takes a value corresponding to the angular velocity θ' with the voltage V2 as the reference voltage (voltage corresponding to angular velocity θ'=0). Therefore, (V1−V2)=$V_g$ becomes the voltage value corresponding to the angular velocity θ'.

The signal V1 is provided to a non-inverting input terminal of an operational amplifier 103 via the HPF including a capacitor 101 and a resistor 102. The reference voltage V2 is supplied to the inverting input terminal of the operational amplifier 103. The operational amplifier 103 outputs a signal of $V_a$=(V1'−V2)K where V1' is the output signal of the HPF, and K[times] is the amplifier magnification of the operational amplifier 103. The output signal of the operational amplifier 103 is converted to a digital signal by an A/D converter 104, and the obtained digital signal is output as the output signal of the HPF calculating part 12a. The configuration of the HPF calculating part 12b is the same as the configuration of the HPF calculating part 12a, and thus the explanation thereof will be omitted.

Figure 4A:
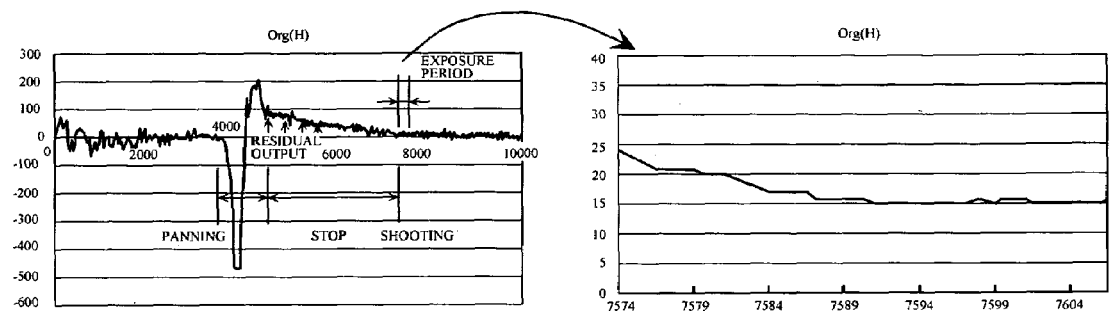

The residual component of the hand shake blur a few seconds before remains in the output of the HPF calculating parts 12a, 12b, which may lower the detecting precision of the hand shake blur. FIG. 4A shows an example in which the residual component of the hand shake blur is produced at the output signal of the HPF calculating part 12a. The figure on the right side is a view enlarging the exposure period part in the figure on the left side. FIG. 4A shows the output signal of the HPF calculating part 12a of when the digital camera comes to rest after being panned, and shooting is performed thereafter. A large output in the negative direction is produced in time of panning of the digital camera. Subsequently, the residual components in the positive direction continue to be output irrespective of the transition of the digital camera to the stop state. If shooting starts in the meantime, the hand shake blur of the residual component amount is detected by mistake.

The time until the residual component becomes 0 becomes smaller the smaller the time constant of the HPF (larger the cut-off frequency), and thus seems as if the time constant of the HPF should simply be made smaller. However, if the time constant is made small (cut-off frequency is made large), the precision of the hand shake blur lowers since not only the drift component, but also the hand shake blur component of low frequency is cut. Furthermore, when attempting to measure the residual component, an accurate calculation becomes difficult since the value changes with elapse of time.

Figure 4B:
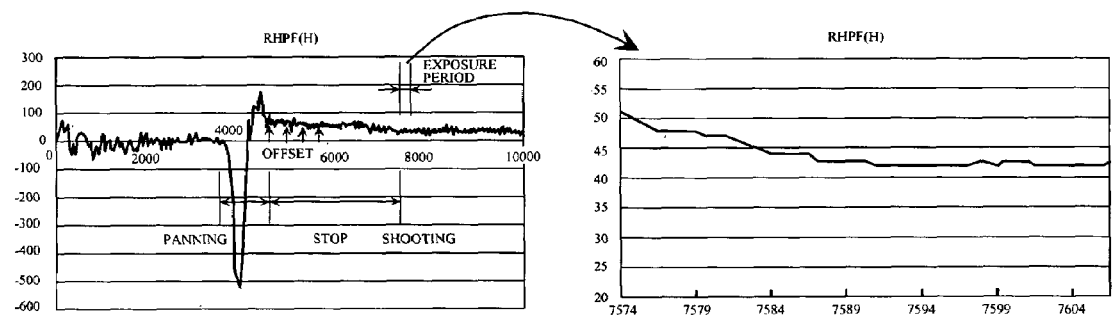
Figure 4C:
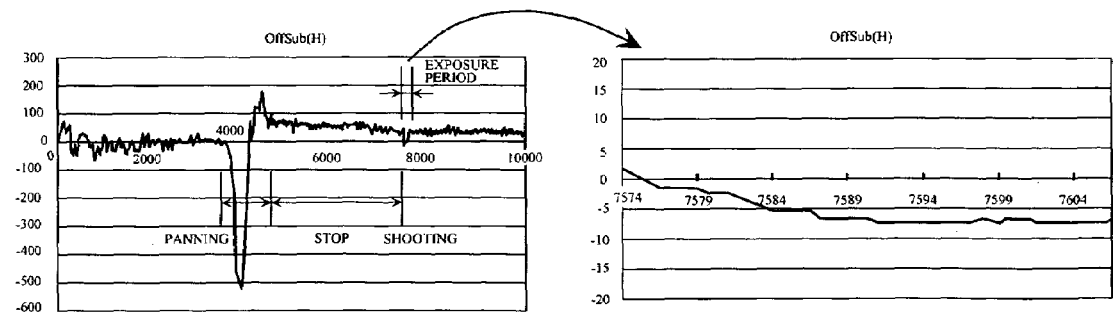
FIG. 4C is a graph showing the result of subtracting the offset value calculated by an offset value calculating part 14a from the output signal of the HPF calculating part 13a during the exposure period.

In the present example, the inverse HPF calculating parts 13a, 13b performs on the output of the HPF calculating parts 12a, 12b, the filter calculation having the property of the inverse transfer function of the HPF used in the HPF calculating parts 12a, 12b. The signal shown in FIG. 4A is converted to the signal shown in FIG. 4B, and the residual component of the hand shake blur is shown as a constant offset. The offset value calculating parts 14a, 14b then calculate the offset values. In the exposure period, the offset values calculated by the offset value calculating parts 14a, 14b are subtracted from the output signal of the inverse HPF calculating parts 13a, 13b. This subtraction is performed by the offset value subtracting parts 15a, 15b. The signal shown in FIG. 4B is converted to the signal shown in FIG. 4C by removing the offset from the output signal of the inverse HPF calculating parts 13a, 13b in the exposure period.

[2-2] Description of Inverse HPF Calculating Parts 13a, 13b

The inverse HPF calculating parts 13a, 13b perform on the output of the corresponding HPF calculating parts 12a, 12b, the filter calculation having the property of the inverse transfer function of the HPF used in the HPF calculating parts 12a, 12b.

Figure 5:
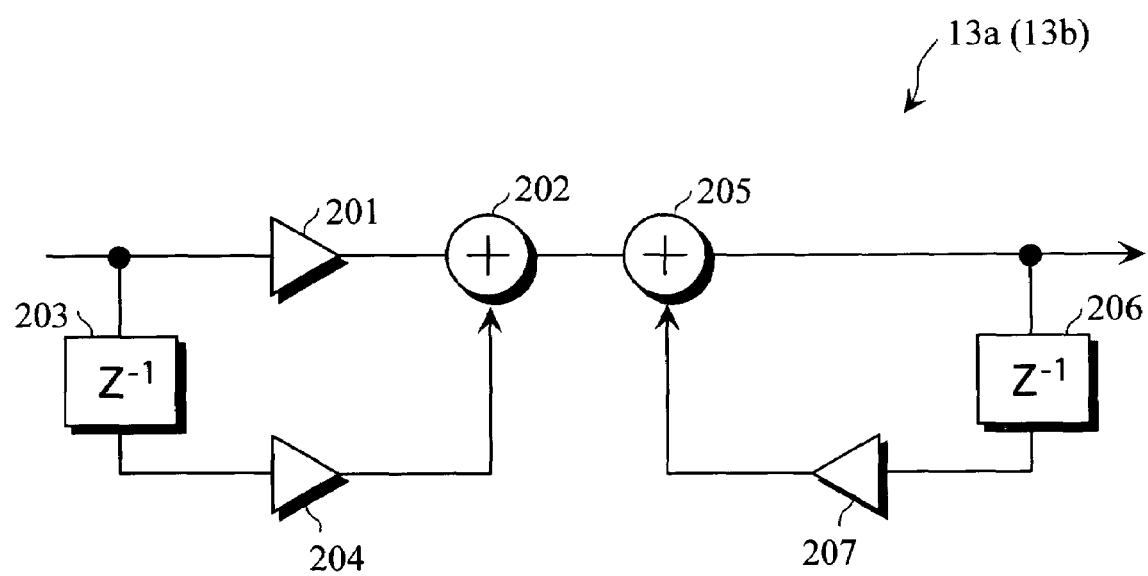
FIG. 5 is a functional block diagram showing a configuration of inverse HPF calculating parts 13a, 13b.

The inverse HPF calculating parts 13a, 13b each perform the calculation shown in FIG. 5, for example. In FIG. 5, 201, 204, 207 are multipliers. 202, 205 are adders. 203 and 206 are delayers. The multipliers 201, 204, 207 multiply the coefficients a0, a1, b1 to the respective input signal. The calculation result of the inverse HPF calculating parts 13a, 13b is maintained over a predetermined time in a memory (not shown).

[2-3] Description of Offset Value Calculating Parts 14a, 14b and Offset Value Subtracting Parts 15a, 15b The offset value calculating part 14a calculates the offset value based on the output signal of the inverse HPF calculating part 13a. The offset value subtracting part 15a subtracts the offset value calculated by the offset value calculating part 14a from the output signal of the inverse HPF calculating part 13a within the exposure period.

The offset value calculating part 14b calculates the offset value based on the output signal of the inverse HPF calculating part 13b. The offset value subtracting part 15b subtracts the offset value calculated by the offset value calculating part 14b from the output signal of the inverse HPF calculating part 13b within the exposure period.

Only the offset calculation process by the offset value calculating part 14a will be explained since the content of the offset calculation process by the offset value calculating parts 14a, 14b are the same.

Figure 6:
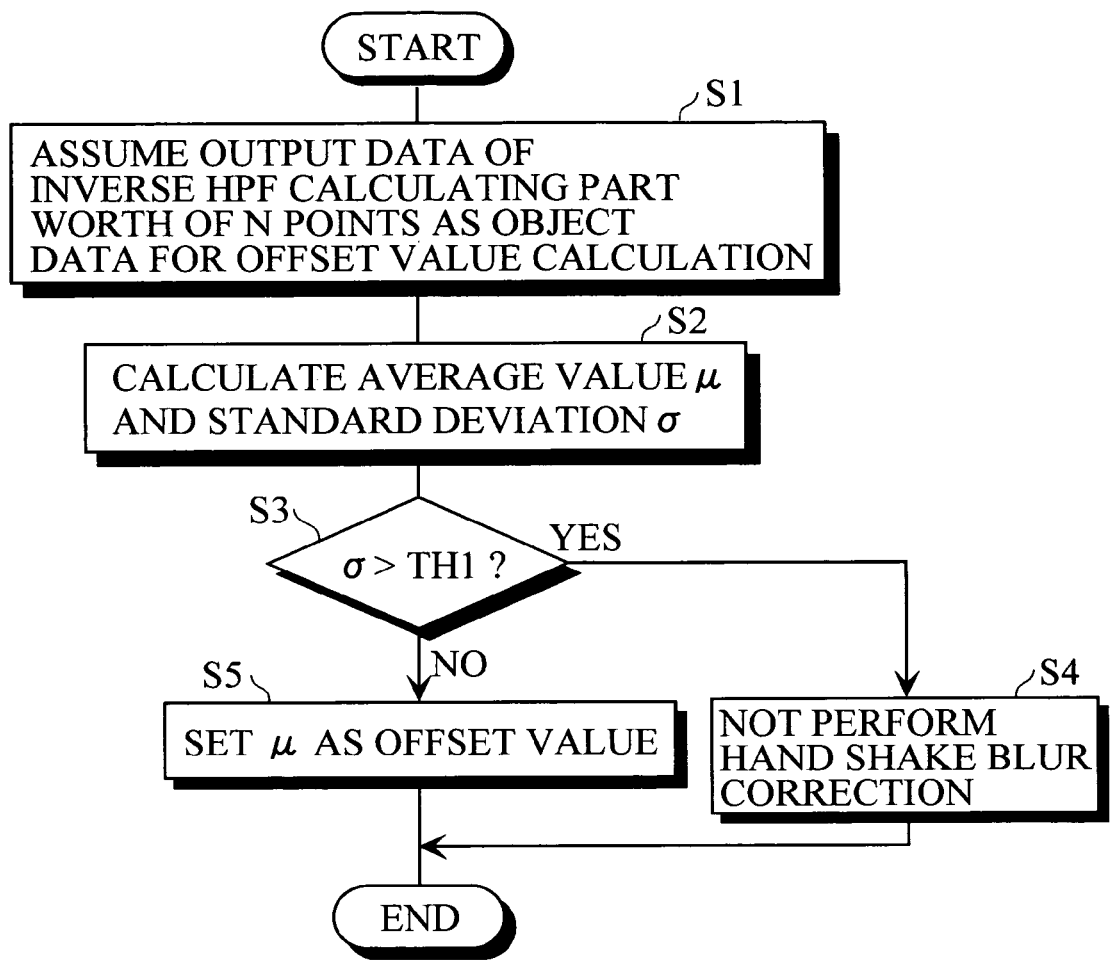

FIG. 6 shows the procedures for the offset value calculation process by the offset value calculating part 14a.

First, the output data of the inverse HPF calculating part 13a worth of N points (e.g., 1000 points) before the start of exposure (before the start of shooting) is assumed as the object data for the offset value calculation (step S1).

The average value μ and the standard deviation σ of the object data for the offset value calculation are calculated (step S2).

Determination is made on whether or not the standard deviation σ is greater than a threshold value TH1 set in advance (step S3).

If the standard deviation σ is greater than the threshold value TH1 (σ>TH1), the data worth of N points are determined as not stable, and a signal indicating that the sensor signal is invalid is output (step S4). In this case, the hand shake blur correction is not performed on the photographed picture.

If the standard deviation σ is less than or equal to the threshold value TH1 (σ≦TH1), the average value μ calculated in step S2 becomes the offset value (step S5).

The hand shake blur picture and the hand shake blur information (e.g., movement vector obtained in the hand shake blur signal/movement vector conversion processing part 16 to be hereinafter described) are stored in shooting, and the output signal of the inverse HPF calculating part 13a worth of N points before and after the start of exposure including before the start of exposure and after the start of exposure is preferably assumed as the object data for the offset value calculation in step S1 when performing the hand shake blur correction on the hand shake blur picture after shooting.

Figure 7:
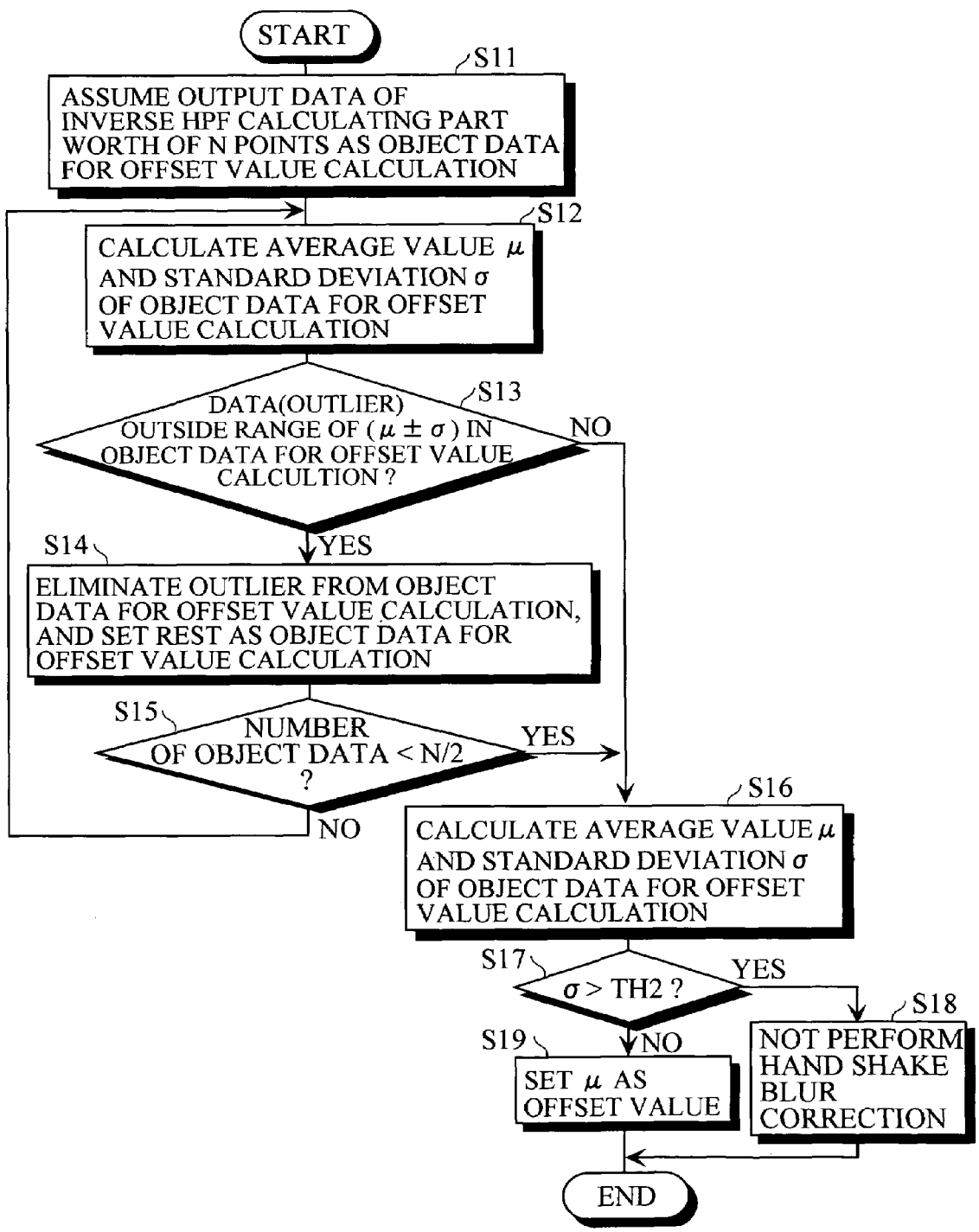

FIG. 7 shows the procedures of another example of the offset value calculating process by the offset value calculating part 14a.

First, the output data of the inverse HPF calculating part 13a worth of N points (e.g., 1000 points) of before the start of exposure (before the start of shooting) is assumed as the object data for the offset value calculation (step S11).

The average value μ and the standard deviation σ of the object data for the offset value calculation are calculated (step S12). Next, determination is made on whether or not the data (outlier) outside the range of (μ±σ) are in the object data for the offset value calculation (step S13). If the outlier is present, the outlier is eliminated from the object data for the offset value calculation, and the rest is set as the object data for the offset value calculation (step S14). Determination is then made on whether or not the number of object data for the offset value calculation is less than N/2 (step S15). If the number of object data for the offset value calculation is greater than or equal to N/2, the process returns to step S12.

If determined that the outlier is not present in step S13, or if determined that the number of object data for the offset value calculation is less than N/2, the process proceeds to step S16. In step S16, the average value μ and the standard deviation σ of the object data for the offset value calculation are calculated. Determination is then made on whether or not the data standard deviation σ is greater than a threshold value TH2 set in advance (step S17).

If the standard deviation σ is greater than the threshold value TH2 (σ<TH2), the object data for the offset value calculation is determined as not stable, and a signal indicating that the sensor signal is invalid is output (step S18). In this case, the hand shake blur correction is not performed on the photographed picture.

If the standard deviation σ is less than or equal to the threshold value (σ≦TH2), the average value μ calculated in step S16 becomes the offset value (step S19).

The hand shake blur picture and the hand shake blur information (e.g., movement vector obtained in the hand shake blur signal/movement vector conversion processing part 16 to be hereinafter described) are stored in shooting, and the output signal of the inverse HPF calculating part 13a worth of N points before and after the start of exposure including before the start of exposure and after the start of exposure is preferably assumed as the object data for the offset value calculation in step S11 when performing the hand shake blur correction on the hand shake blur picture after shooting.

[2-4] Description of Hand Shake Blur Signal/Movement Vector Conversion Processing Part 16

The hand shake blur signal/movement vector conversion processing part 16 generates the movement vector that is the apparent movement amount on the screen based on the signal in which the offset value is subtracted by the offset subtracting part 15a from the output signal of the inverse HPF calculating part 13a within the exposure period, and the signal in which the offset value is subtracted by the offset subtracting part 15b from the output signal of the inverse HPF calculating part 13b within the exposure period.

The original data of the hand shake blur is the signal (angular velocity data in the pan direction) in which the offset value is subtracted by the offset subtracting part 15a from the output signal from the start of shooting to the end of shooting (exposure period) out of the output signals of the inverse HPF calculating part 13a, and the signal (angular velocity data in the tilt direction) in which the offset value is subtracted by the offset calculating part 15b from the output signal from the start of shooting to the end of shooting (exposure period) out of the output signals of the inverse HPF calculating part 13b. The sampling interval of the angular velocity sensors 11a, 11b is assumed as dt[sec]. The dt[sec] is for example, 1 msec.

In FIG. 3, assuming that the capacitor and the resistor configuring the HPF are omitted, the angular velocity θ'[deg/sec] in the pan direction of the camera is converted to the voltage $V_g=(V1-V2)$ [mV] by the angular velocity sensor 11a, and then amplified by the operational amplifier 103. The voltage $V_a$ [mV] output from the operational amplifier 103 is converted to the digital value $D_L$[step] by the A/D converter 104. In order to convert the data obtained as the digital value to the angular velocity, calculation is performed using the sensor sensitivity S [mV/deg/sec], the amplifier magnification K[times] of the operational amplifier 103, and the A/D conversion coefficient L [mV/step].

The voltage value $V_g$ [mV] obtained by the angular velocity sensor 11a is proportional to the value of the angular velocity θ'[deg/sec]. The proportionality constant at this point is the sensor sensitivity, and thus $V_g$ [mV] is expressed by equation (1).

$$V_g = S\theta' \tag{1}$$

Since the operational amplifier 103 simply amplifies the voltage value Vg, the amplified voltage $V_a$ [mV] is expressed by equation (2).

$$V_a = KV_g \tag{2}$$

The voltage value $V_a$ [mV] amplified by the operational amplifier 103 is A/D converted, and expressed using the digital value $D_L$[step] of n[step] (e.g., −512 to 512). If the A/D conversion coefficient is L [mV/step], the digital value $D_L$[step] is expressed by equation (3).

$$D_L = V_a/L \tag{3}$$

As shown in equation (4), the angular velocity is obtained from the digital value $D_L$[step] using equations (1) to (3).

$$\theta' = (L/KS)D_L \tag{4}$$

How much shake is produced on the photographed image is calculated from the angular velocity data during shooting. The apparent movement on the image is referred to as the movement vector.

The panning amount produced at the camera from one sample value to the next sample value of the angular data is assumed as θ[deg]. The θ[deg] is expressed by equation (5) assuming that the camera pans at a constant angular velocity and the sampling frequency is f=1/dt [Hz].

$$\theta = \theta'/f = (L/KSf)D_L \tag{5}$$

Figure 8:
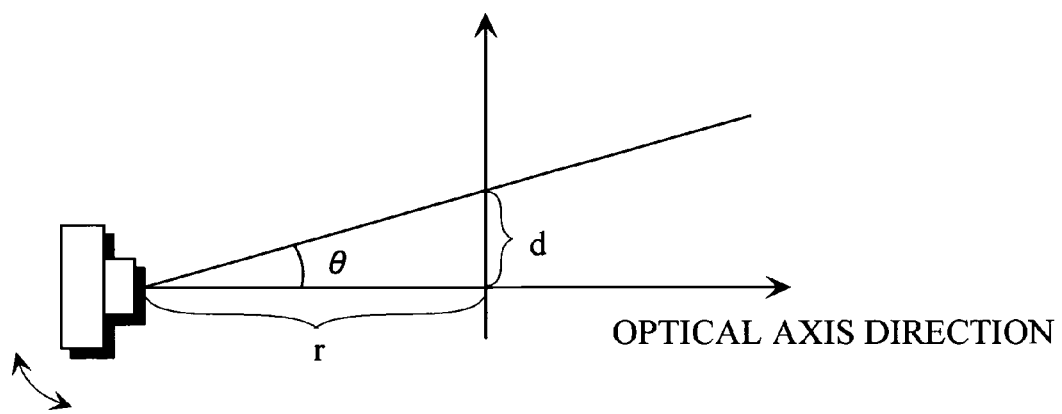
FIG. 8 is a frame format view showing the relationship between panning amount θ [deg] of the camera and movement amount d [mm] on the screen.

As shown in FIG. 8, if r [mm] is the focal distance (35 [mm] film conversion), the movement amount d [mm] on the screen is obtained by equation (6) from the panning amount θ[deg] of the camera.

$$d = r\tan\theta \tag{6}$$

The movement amount d [mm] obtained here is the size of the hand shake blur in the 35 [mm] film conversion and the unit is in [mm]. When actually performing the calculation process, the size of the image must be considered in the unit [pixel] of the size of the image of the digital camera.

Figure 9:
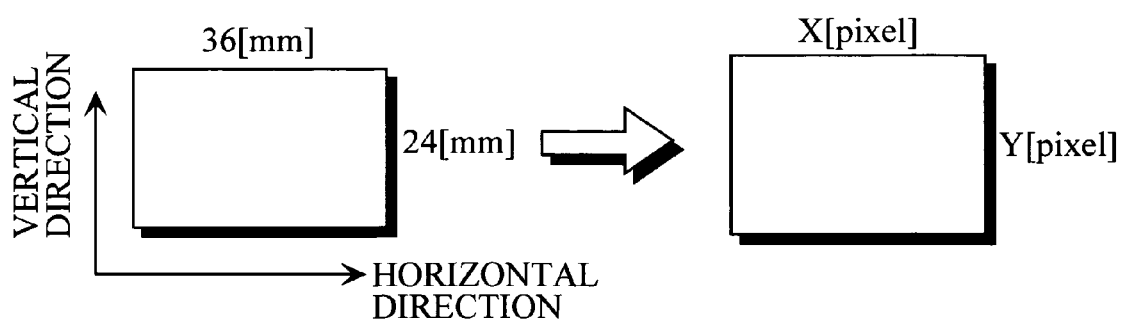
FIG. 9 is a frame format view showing an image size of 35 [mm] film conversion and an image size of a digital camera.

Since the image of the 35 [mm] film conversion and the image in unit of [pixel] photographed with the digital camera have different aspect ratio, the following calculation must be performed. As shown in FIG. 9, the image is known to be 36 [mm] by 24 [mm] in the 35 [mm] film conversion. If the size of the image photographed with the digital camera is X[pixel]×Y[pixel], the shake in the horizontal direction (pan direction) is x[pixel], and the shake in the vertical direction (tilt direction) is y[pixel], the conversion equation becomes equations (7) and (8).

$$x = d_x(X/36) = r\tan\theta_x(X/36) \tag{7}$$

$$y = d_y(Y/24) = r\tan\theta_y(Y/24) \tag{8}$$

The suffixes x and y are used for d and θ in equations (7) and (8), where the suffix x indicates the value in the horizontal direction and the suffix y indicates the value in the vertical direction.

Summarizing equations (1) to (8), the shake in the horizontal direction (pan direction) x [pixel] and the shake in the vertical direction (tilt direction) y [pixel] are expressed by equations (9) and (10).

$$x = r\tan\{(L/KSf)D_{Lx}\}X/36 \quad (9)$$

$$y = r\tan\{(L/KSf)D_{Ly}\}Y/24 \quad (10)$$

The shake amount (movement vector) of the image is obtained from the angular velocity data of each axis of the camera obtained as the digital value by using conversion equations (9) and (10).

In this example, the signal in which the offset value is subtracted by the offset subtracting part 15a from the output signal of the inverse HPF calculating part 13a within the exposure period is used as $D_{Lx}$, and the signal in which the offset value is subtracted by the offset subtracting part 15b from the output signal of the inverse HPF calculating part 13b within the exposure period is used as $D_{Ly}$.

The movement vector during shooting can be obtained for the number of data of the angular velocity obtained from the sensor (number of sample points), and the trajectory of the hand shake blur on the image is obtained by connecting the starting point and the end point in order. The speed of the hand shake blur at a certain point in time becomes apparent by looking at the size of each vector.

[3] Description of Image Restoration Filter Calculating Section 2

The image restoration filter calculating section 2 includes a movement vector/hand shake blur function conversion processing part 21 for converting the movement vector, obtained by the hand shake blur signal/movement vector conversion processing part 16 (see FIG. 2) in the hand shake blur detecting section 1, to the hand shake blur function (PSF: Point Spread Function) indicating the blur of the image, and a hand shake blur function/generalized inverse filter conversion processing part 22 for converting the hand shake blur function, obtained by the movement vector/hand shake blur function conversion processing part 21, to a generalized inverse filter (image restoration filter).

[3-1] Description on Movement Vector/Hand Shake Blur Function Conversion Processing Part 21

The hand shake blur can be indicated with a spatial filter. When the elements of the operator are weighed and the spatial filter processing is performed in accordance with the trajectory (trajectory drawn by a certain point on the image when the camera is shaken, the shake amount of the image) of the hand shake blur shown on the left side of FIG. 10, the hand shake blur image can be created since only the concentration values of the neighboring pixels in which the concentration value of the pixel corresponds to the trajectory of the hand shake blur is taken into consideration in the filtering process.

The operator weighed according to the trajectory is referred to as Point Spread Function (PSF), and is used as a mathematical model of the hand shake blur. The weight of each element of the PSF is a value proportional to the time in which the relevant element passes the hand shake blur trajectory, and is a value standardized so that the sum of the weight of each element becomes 1. That is, the weight is proportional to the inverse number of the size of the movement vector. When considering the influence of the hand shake blur on the image, a greater influence is made on the image at where the movement is slow.

Figure 10:
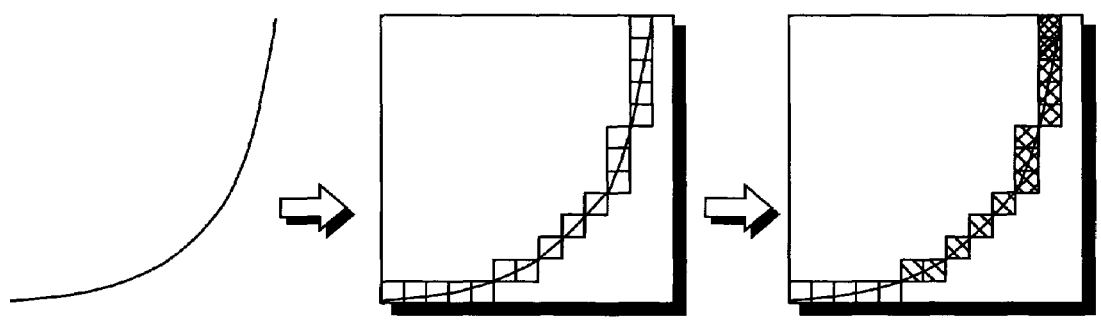
FIG. 10 is a frame format view showing a spatial filter (PSF) for depicting the hand shake blur.

The center of FIG. 10 shows the PSF of when the movement of the hand shake is a constant speed, and the right side of FIG. 10 shows the PSF of when the size of the movement of the actual hand shake is considered. According to the right side of FIG. 10, the element of low weight (size of movement vector is large) of the PSF is shown black, and the element of high weight (size of movement vector is small) is shown white.

The movement vector (shake amount of image) obtained in [2-4] includes the trajectory of the hand shake blur and the speed of the trajectory as data.

In creating the PSF, the element to be applied with the weight of the PSF is determined from the trajectory of the hand shake blur. The weight to be applied to the element of the PSF is determined from the speed of the hand shake blur.

The trajectory of the broken line approximated hand shake blur is obtained by connecting a series of movement vectors obtained in [2-4]. This trajectory has a precision to after the decimal point, but the element to be applied with the weight of the PSF is determined by making it an integer. To this end, the element to be applied with the weight in the PSF is determined using the line drawing algorithm of Bresenham in the present example. The line drawing algorithm of Bresenham is an algorithm of selecting a suitable dot position when desiring to draw a line that passes through two arbitrary points on the digital screen.

Figure 11:
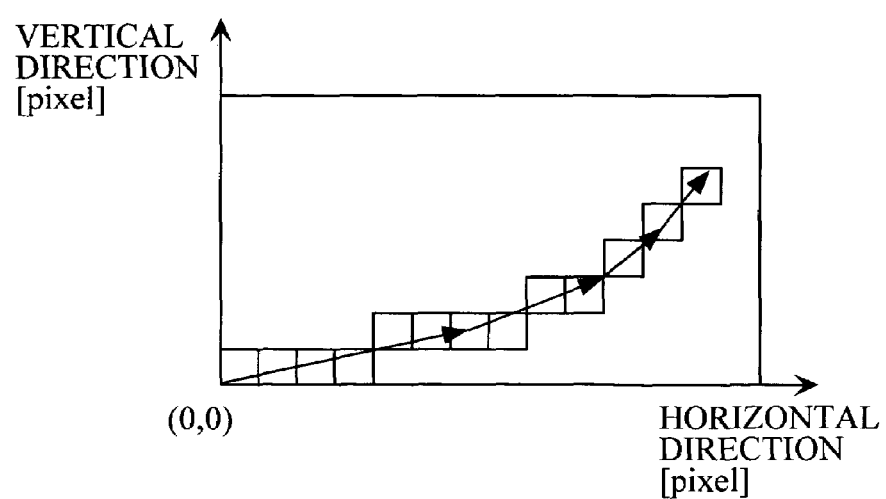
FIG. 11 is a frame format view for explaining a line drawing algorithm of Bresenham.

The line drawing algorithm of Bresenham will now be described using an example of FIG. 11. In FIG. 11, the line with an arrow indicates the movement vector.

(a) Starting from the origin (0, 0 ) of the dot position, the element in the horizontal direction of the movement vector is increased by one.

(b) The position in the vertical direction of the movement vector is checked, and if such position in the vertical direction is greater than one compared to the previous position in the vertical direction of the dot, the vertical direction of the dot position is increased by one.

(c) The element in the horizontal direction of the movement vector is again increased by one.

The line where the movement vector passes can be expressed with the dot position by repeating the above processes until the end of the movement vector.

Figure 12:
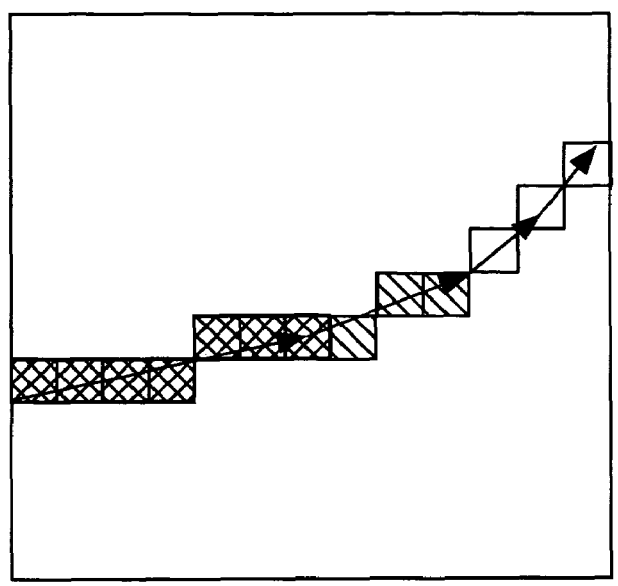
FIG. 12 is a frame format view showing the PSF obtained by the movement vector of FIG. 11.

The weight applied to the element of the PSF is determined using the fact that the size (speed component) of the vector differs for each movement vector. The weight takes an inverse number of the size of the movement vector, and the weight is substituted to the element corresponding to each movement vector. However, the weight of each element is standardized so that the sum of the weight of each element becomes one. FIG. 12 shows the PSF obtained by the movement vector of FIG. 11. The weight becomes smaller where the speed is fast (where the movement vector is long), and the weight becomes larger where the speed is slow (where the movement vector is short).

[3-2] Description on Hand Shake Blur Function/Generalized Inverse Filter Conversion Processing Part 22

The image is assumed to be digitalized at a resolution of $N_x$ pixels in the horizontal direction, and $N_y$ pixels in the vertical direction. The value of the pixel at the $i^{th}$ position in the horizontal direction and the $j^{th}$ position in the vertical direction is expressed as p(i,j). The conversion of the image by the spatial filter means modeling the conversion through convolution of the neighboring pixels of the pixel of interest. The coefficient of convolution is h(l,m). Assuming −n<l, m<n for the sake of simplicity, the conversion of the pixel of interest can be expressed by equation (11). The h(l,m) itself is also referred to as the spatial filter, or the filter coefficient. The nature of the conversion is determined by the coefficient value of h(l,m).

$$p'(i, j) = \sum_{l=-n}^{l=n} \sum_{m=-n}^{m=n} h(l, m) \times p(i+l, j+m) \quad (11)$$

When observing the point light source with an imaging apparatus such as a digital camera, the image observed on the image has only a certain point taking a pixel value other than zero and the other pixel values taking the value pf zero on the assumption that degradation does not occur in the formation process of the image. The actual imaging apparatus includes the degradation process, and thus even if the point light source is observed, the image thereof is not a point, but a spread image. If hand shake blur occurs, the point light source generates the trajectory corresponding to the hand shake blur on the screen.

The spatial filter having a value proportional to the pixel value of the observed image for the point light source as the coefficient and having the sum of the coefficient values as one is referred to as Point Spread Function (PSF). In this example, the PSF obtained by the movement vector/hand shake blur function conversion processing part 21 is used as the PSF.

When modeling the PSF with the spatial filter h (l, m) of (2n+1) by (2n+1), where −n<l, m<n, the pixel value p (i, j) of an image without blur and the pixel value p' (i, j) of an image with blur are in relationship of equation (11) for each pixel. Only the pixel value p' (i, j) of an image with blur can actually be observed, and the pixel value p (i, j) of an image without blur must be calculated in some way.

Equation (12) is obtained by listing equation (11) for all the pixels.

$$p'(1, 1) = \sum_{l=-n}^{l=n} \sum_{m=-n}^{m=n} h(l, m) \times p(1+l, 1+m) \quad (12)$$

$$p'(1, 2) = \sum_{l=-n}^{l=n} \sum_{m=-n}^{m=n} h(l, m) \times p(1+l, 2+m)$$

...

$$p'(1, N_n) = \sum_{l=-n}^{l=n} \sum_{m=-n}^{m=n} h(l, m) \times p(1+l, N_n+m)$$

$$p'(2, N_n) = \sum_{l=-n}^{l=n} \sum_{m=-n}^{m=n} h(l, m) \times p(2+l, N_n+m)$$

...

$$p'(N_y, N_n) = \sum_{l=-n}^{l=n} \sum_{m=-n}^{m=n} h(l, m) \times p(N_y+l, N_n+m)$$

The equations can be collectively expressed in matrix form, whereby equation (13) is obtained. P is that in which the original image is unified in raster scanning order.

$$P' = H \times P \quad (13)$$

The non-degraded image P can be obtained from the degraded image P' by calculating $P = H^{-1} \times P$ if an inverse matrix $H^{-1}$ of H exists, but generally, the inverse matrix of H does not exist. A generalized inverse matrix or a pseudo-inverse matrix exists for the matrix which inverse matrix does not exist. An example of the generalized inverse matrix is indicated by equation (14).

$$H^* = (H^t \cdot H + \gamma \cdot I)^{-1} \cdot H^t \quad (14)$$

H* is the generalized inverse matrix of H, $H^t$ is the transposed matrix of H, γ is the scalar, and I is the unit matrix of the same size as $H^t \cdot H$. The image P in which the hand shake blur is corrected can be obtained from the observed hand shake blur image P' by calculating the equation (15) using H*. γ is a parameter for adjusting the strength of the correction. If the γ is small, the correction process is strong, and if the γ is large, the correction process is weak.

$$P' = H^* \times P \quad (15)$$

If the image size is 640×480, P of equation (15) becomes a matrix of 307, 200×1, and H* becomes a matrix of 307, 200×307, 200. As an extremely large matrix is obtained, it is not practical to directly use equations (14) and (15). The size of the matrix to be used for calculation is reduced through the following method.

First, in equation (15), the size of the image, which acts as the original of P, is made to a relatively small size of 63×63. In the case of the image of 63×63, P becomes a matrix of 3969×1, and H* becomes a matrix of 3969×3969. H* is a matrix for converting the entire blur image to the entire corrected image, where the product of each row of H* and P corresponds to the calculation of performing the correction of each pixel. The product of the center row of H* and P corresponds to the correction on the center pixel of the original image of 63×63 pixels. Since P is that in which the original image is unified through raster scanning order, the spatial filter of a size of 63×63 can be configured by making the center row of H* into two-dimensional through the inverse raster scanning. The spatial filter configured in this manner is referred to as a generalized inverse filter (hereinafter referred to as image restoration filter).

The blur image can be corrected by sequentially applying the spatial filter of a practical size created in the above manner to each pixel of the entire large image.

[4] Description on Image Restoration Processing Section 3

The image restoration processing section 3 includes filter processing parts 31, 32, as shown in FIG. 1. The filter processing part 31 performs the filter process using a median filter. The filter processing part 32 performs the filter process using the image restoration filter obtained by the image restoration filter calculating section 2. The filter processing part 32 is configured by a two-dimensional FIR filter and the like.

The hand shake blur image photographed with the camera is sent to the filter processing part 31, at where the filter processing is performed using the median filter and the noise is removed. The image obtained by the filter processing part 31 is then sent to the filter processing part 32. In the filter processing part 32, the filter process is performed using the image restoration filer and the image without hand shake blur is restored from the image with hand shake blur.

[5] Description of Ringing Removal Processing Section 4

The ringing removal processing section 4 includes an edge strength calculating part 41, a weighted average coefficient calculating part 42, and a weighted average processing part 43, as shown in FIG. 1.

The hand shake blur image photographed with the camera is sent to the edge strength calculating part 41, where the edge strength is calculated for each pixel. The manner of obtaining the edge strength will now be described.

Figure 13:
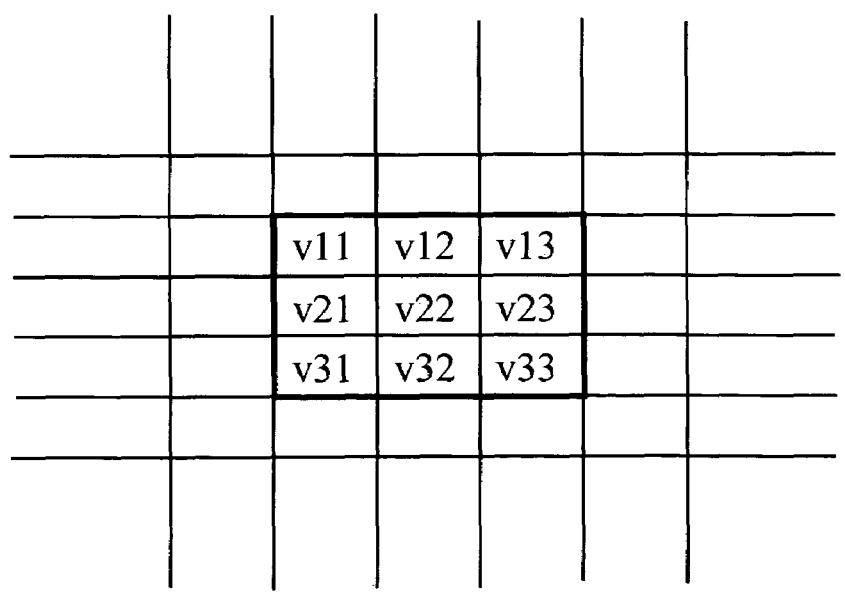
FIG. 13 is a frame format view showing a region of 3×3 with a pixel of interest v22 as the center.
Figures 14A, 14B, 15:
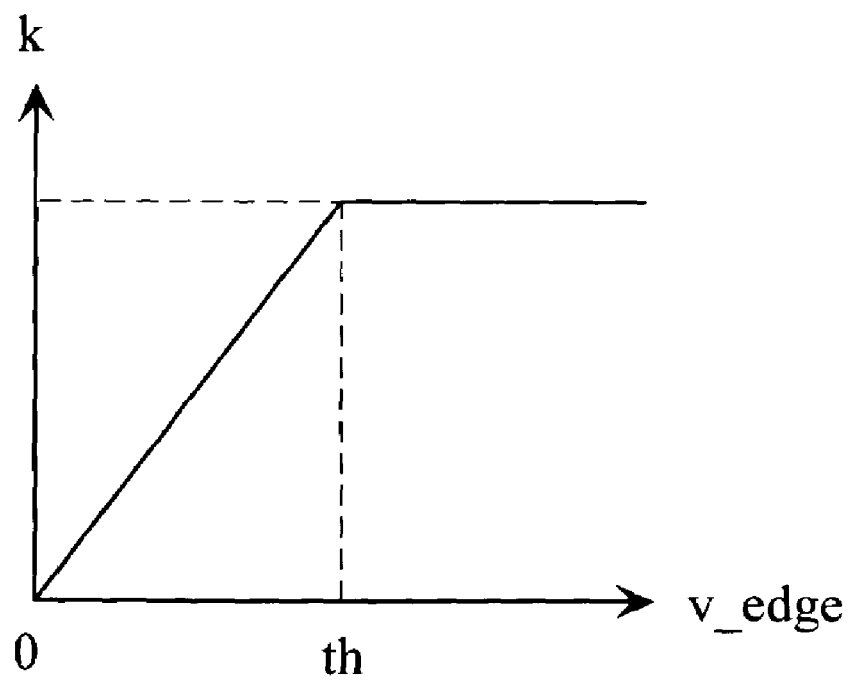
FIG. 14A is a frame format view showing a horizontal edge extraction operator.
FIG. 14B is a frame format view showing a vertical extraction operator.
FIG. 15 is a graph showing the relationship between edge strength v_edge and weighted average coefficient k.

As shown in FIG. 13, the region of 3×3 with the pixel of interest v22 as the center is considered. The horizontal edge component dh and the vertical edge component dv are calculated for the pixel of interest v22. In calculation of the edge component, the edge extraction operator of Prewitt shown in FIG. 14 is used, for example. FIG. 14A shows the horizontal edge extraction operator, and FIG. 14B shows the vertical edge extraction operator.

The horizontal edge component dh and the vertical edge component dv are obtained from equations (16) and (17).

$$dh = v11 + v12 + v13 - v31 - v32 - v33 \quad (16)$$

$$dv = v11 + v21 + v31 - v13 - v23 - v33 \quad (17)$$

The edge strength v_edge of the pixel of interest v22 is calculated based on equation (18) from the horizontal edge component dh and the vertical edge component dv.

$$v\_edge = \mathrm{sqrt}(dh \times dh + dv \times dv) \quad (18)$$

The abs(dh)+abs(dv) may be used as the edge strength v_edge of the pixel of interest v22. The noise removal filter of 3×3 may be further applied on the edge strength image obtained in the above manner.

The edge strength v_edge of each pixel calculated by the edge strength calculating part 41 is provided to the weighted average coefficient calculating part 42. The weighted average coefficient calculating part 42 calculates the weighted average coefficient k of each pixel based on the equation (19).

$$\text{If } v\_edge > th \text{ then } k = 1$$

$$\text{If } v\_edge \leq th \text{ then } k = v\_edge/th \quad (19)$$

The th is a threshold value for determining as a sufficiently strong edge. That is, the relationship between the v_edge and the weighted average coefficient k becomes the relationship shown in FIG. 15.

The weighted average coefficient k of each pixel calculated by the weighted average coefficient calculating part 42 is provided to the weighted average processing part 43. If the pixel value of the restored image obtained by the image restoration processing section 3 is v_stab, and the pixel value of the hand shake blur image imaged with the camera is v_blur, the weighted average processing part 43 weights and averages the pixel value v_stab of the restored image and the pixel value v_blur of the hand shake blur image by performing the calculation of equation (20).

$$v = k \times v\_stab + (1-k) \times v\_blur \quad (20)$$

That is, for the pixel in which the edge strength v_edge is greater than the threshold value th, the ringing of the restored image corresponding to such position is not significant, and thus the pixel value v_stab of the restored image obtained by the image restoration processing section 3 is output as it is. For the pixel in which the edge strength v_edge is less than or equal to the threshold value th, the ringing of the restored image becomes significant the smaller the edge strength v_edge, and thus the degree of the restored image is weakened and the degree of the hand shake blur image is strengthened.

What is claimed is:

1. A hand shake blur detecting apparatus for detecting hand shake blur of an imaging device based on an output signal of a hand shake blur sensor for detecting the hand shake blur of the imaging device; the hand shake blur detecting apparatus comprising:

a high pass filter calculating means for removing low frequency component from the output signal of the hand shake blur sensor;

an inverse high pass filter calculating means, having an inverse transfer function of a transfer function of the high pass filter calculating means, for filtering an output signal of the high pass filter calculating means;

an offset value calculating means for calculating the offset value based on an output data of the inverse high pass filter calculating means; and an offset value subtracting means for subtracting the offset value calculated by the offset value calculating means from the output data of the inverse high pass filter calculating means.

2. The hand shake blur detecting apparatus according to claim 1, wherein the offset value calculating means calculates an average value of the output data of the inverse high pass filter calculating means within a predetermined period before the start of exposure by the imaging device, and sets the calculated average value as the offset value.

3. The hand shake blur detecting apparatus according to claim 1, wherein the offset value calculating means calculates the average value of the output data of the inverse high pass filter calculating means within a predetermined period including before and after the start of exposure by the imaging device, and sets the calculated average value as the offset value.

4. The hand shake blur detecting apparatus according to claim 1, wherein the offset value calculating means calculates the average value of object data for offset value calculation and sets the calculated average value as the offset value, the object data for offset value calculation consisting of, out of the output data of the inverse high pass filter calculating means within a predetermined period before the start of exposure by the imaging device, only the output data within a predetermined range with the average value of the output data as the center.

5. The hand shake blur detecting apparatus according to claim 1, wherein the offset value calculating means calculates the average value of object data for offset value calculation and sets the calculated average value as the offset value, the object data for offset value calculation consisting of, out of the output data of the inverse high pass filter calculating means within a predetermined period including before and after the start of exposure by the imaging device, only the output data within a predetermined range with the average value of the output data as the center.

* * * * *